United States Patent
Knight

[15] 3,670,818
[45] June 20, 1972

[54] MOBILITY CONTROL IN OIL RECOVERY PROCESSES

[72] Inventor: Bruce L. Knight, Littleton, Colo.
[73] Assignee: Marathon Oil Company, Findlay, Ohio
[22] Filed: April 29, 1970
[21] Appl. No.: 33,021

[52] U.S. Cl. ............................................. 166/273, 166/274
[51] Int. Cl. ....................................................... E21b 43/22
[58] Field of Search ..................... 166/273, 274, 275, 305 R; 252/8.55 D

[56] References Cited

UNITED STATES PATENTS

| | | | |
|---|---|---|---|
| 3,406,754 | 10/1968 | Gogarty | 166/273 |
| 2,827,964 | 3/1958 | Sandiford | 166/275 X |
| 2,341,500 | 2/1944 | Detling | 166/274 UX |
| 2,731,414 | 1/1956 | Binder, Jr. et al. | 166/274 |
| 3,308,883 | 3/1967 | Foster | 166/275 |
| 2,927,637 | 3/1960 | Draper | 166/273 |
| 3,039,529 | 6/1962 | McKennon | 166/275 |
| 3,261,399 | 7/1966 | Coppel | 166/273 |

*Primary Examiner*—Stephen J. Novosad
*Attorney*—Joseph C. Herring, Richard C. Willson, Jr. and Jack L. Hummel

[57] ABSTRACT

Improved secondary and tertiary recovery processes wherein a mobility buffer is used are improved by alternately injecting mobility buffer slugs (containing mobility reducing agents) and slugs of water followed by a driving agent. For example, improved crude oil recoveries with emulsion and micellar systems are obtained by alternately injecting aqueous slugs containing mobility reducing agents and slugs of water followed by drive water to displace the system through the reservoir. The mobility buffer slugs can have progressively decreasing concentrations of the mobility reducing agent relative to the initial mobility buffer slug.

12 Claims, 1 Drawing Figure

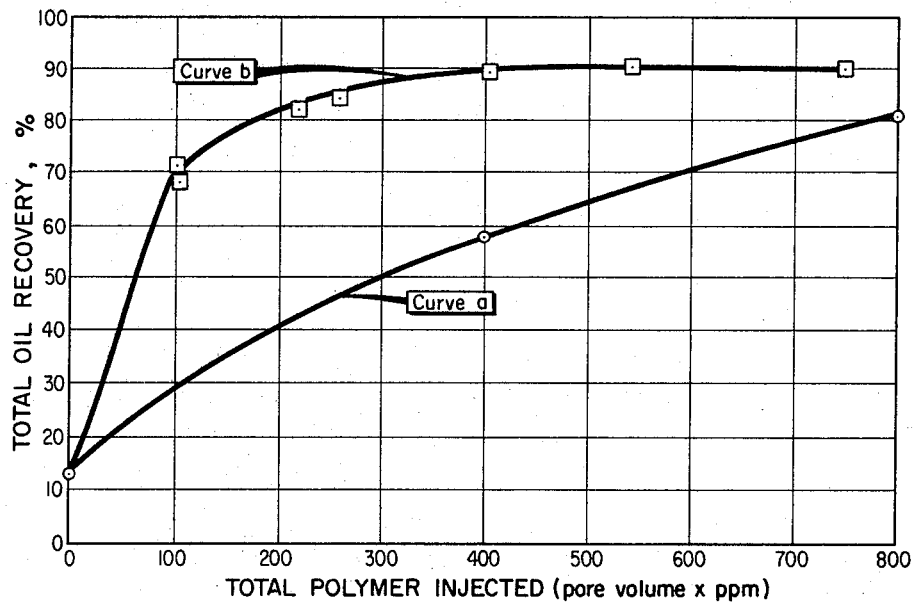
OIL RECOVERY vs TOTAL POLYMER INJECTED

MOBILITY CONTROL IN OIL RECOVERY PROCESSES

BACKGROUND OF THE INVENTION

1. Field of the Invention.

This invention relates to recovering crude oil form a subterranean reservoir having an injection means in fluid communication with a production means and wherein a flooding agent is injected followed by a mobility reducing agent and this, in turn, followed by drive water.

2. Description of the Prior Art.

It is known in the prior art that emulsions and micellar solutions and miscible agents such as alcohols, ketones, aldehydes, and like materials, optionally dissolved in aqueous or hydrocarbon systems, and surfactants (dissolved in aqueous or non-aqueous systems) are useful to recover crude oil from a subterranean reservoir. Mobility control is important is secondary or tertiary recovery processes using these agents. Mobility control is obtained by following the primary slug with a slug containing a mobility reducing agent, e.g., an aqueous solution containing a partially hydrolyzed, high molecular weight polyacrylamide, polysaccharide, natural polymer, synthesized polymers, etc. Thereafter, the mobility buffer slug is followed by a drive material such as hydrocarbon or water to displace the system through the reservoir. Crude oil is recovered through a production means in fluid communication with the reservoir.

Examples of flooding processes are taught in U.S. Pat. No. 3,497,006 to Jones et al. and U.S. Pat. No. 3,254,714 to Gogarty et al. These patents teach that a micellar dispersion is injected into a reservoir, followed by a mobility reducing agent and this, in turn, followed by a drive water. The micellar dispersion performs like a miscible-type flooding agent to recover up to 100 percent of the oil.

In the use of mobility reducing agents within mobility buffer slugs to improve the flooding characteristics and protect against fingering, it is generally accepted that the primary displacing slug be followed by a slug of water containing the mobility reducing agent and this, in turn, followed by a drive water. The slug containing the mobility reducing agent can have graded mobilities therein to give improved flooding characteristics.

SUMMARY OF THE INVENTION

Applicant has discovered a novel method of improving flooding processes in secondary and tertiary recovery methods. This improvement is obtained by following the primary displacing slug with alternate aqueous slugs containing first mobility reducing agent and then slugs of water and then followed by a drive material such as water. The alternate slugs are relatively small, usually less than 25 percent and preferably less than 15 percent of the formation pore volume. The mobility buffer slugs can have progressively reduced concentrations of the mobility reducing agent relative to the initial mobility buffer slug.

BRIEF DESCRIPTION OF THE DRAWING

The FIGURE indicates the amount of tertiary oil recovery vs. the total polymer injected [total polymer injected is obtained by multiplying the fractional pore volume of polymer solution times the polymer solution concentration defined as ppm. (parts per million)]. A constant fractional pore volume of micellar solution is injected for the two curves. Curve *a* illustrates the amount of tertiary oil recovered by following a micellar solution with one bank of aqueous slug containing a constant composition of partially hydrolyzed, high molecular weight polyacrylamide. Curve *b* represents the amount of tertiary oil recovery by following a micellar solution (same volume and identical solution as used in Curve *a*) with multiple alternate slugs of aqueous solutions first containing partially hydrolyzed, high molecular weight polyacrylamide and then slugs of water. The difference in oil recoveries between Curves *a* and *b* is an indication of the increased or improved effectiveness of multiple alternate slugs of mobility buffer and water as taught by this invention.

DESCRIPTION OF THE PREFERRED EMBODIMENTS

A displacing fluid may precede the initial mobility buffer slug. Examples of displacing fluids include both miscible and immiscible systems and those fluids having characteristics of both. Specific examples of displacing fluids include oil-external and water-external emulsions, oil-external and water-external micellar dispersion, anhydrous soluble oils, nonaqueous and aqueous mediums containing agents to reduce interfacial tension between hydrocarbon and water, e.g., alcohols, aldehydes, surfactants, ketones, etc., and like materials. Specific examples of useful displacing materials include those defined in U.S. Pat. Nos. 3,254,714 and 3,467,187 to Gogarty et al.; and U.S. Pat. No. 3,497,006 to Jones et al. The displacing fluid can be composed of similar or dissimilar fluids injected separately and can be liquid, foam, combinations of liquid and foam, etc.

The mobility buffer is substantially aqueous. It contains sufficient mobility reducing agent to substantially reduce the mobility of the water. Any mobility reducing agent is useful with this invention as long as the agent effectively reduces the relative mobility of the fluid flowing in the reservoir. Examples of useful mobility reducing agents include polysaccharides, partially hydrolyzed high molecular weight polyacrylamides such as the Pusher polymers sold by Dow Chemical Company, Midland, Michigan, naturally occurring high molecular weight polymers and synthesized high molecular weight polymers, copolymers, terpolymers, etc. The mobility buffer can contain other additives such as bactericides, corrosion inhibiting agents, etc. Also, the mobility buffer can contain electrolytes, preferably compatible with the ions within the formation.

The mobility buffer is followed by a drive material which can be aqueous or non-aqueous but which is preferably aqueous. The drive material can contain electrolytes or salts, but preferably the electrolytes are compatible with the salts within the subterranean formation.

The initial slug of mobility buffer is small, but preferably has a higher concentration of mobility buffer agent relative to the subsequent slugs of mobility buffer. The size of the mobility buffer slug is preferably less than about 25 percent of the formation pore volume, and more preferably at least about 5 percent and less than 15 percent pore volume. This initial slug is followed by alternate water slugs and mobility buffer slugs, the latter usually containing lesser amounts of mobility reducing agents. After the last desired slug of mobility buffer is injected, drive water is injected to displace the flooding fluids through the reservoir.

The subsequent volumes of mobility buffer are generally smaller in volume, as mentioned earlier, and can contain lesser concentrations of mobility reducing agent. However, mobility buffer slugs constant in volume and concentration give good results.

The volume of water slug injected after each mobility buffer slug is preferably less than about 25 percent formation pore volume and more preferably at least about 5 percent and less than 15 percent pore volume.

At least two mobility buffer slugs are injected and preferably at least four slugs are injected. Each slug is followed by a water slug except the last one and then drive water is continuously injected.

The following example is presented to teach specific working embodiments of the invention. Unless otherwise specified, the percents are based on volume:

EXAMPLE 1

Berea sandstone cores 4 feet long by 3 inches in diameter are saturated with water, then flooded with crude oil to irreducible water saturation and thereafter flooded with water to residual oil saturation. The cores are flooded with 2 percent formation volume of identical micellar dispersion followed by alternate slugs of water containing Dow Pusher No 700 (a high molecular weight, partially hydrolyzed polyacrylamide marketed by Dow Chemical Company, Midland, Michigan), and water. The concentration of Pusher within each slug of mobility buffer is expressed in ppm, i.e., parts per million. The residual oil saturations of the cores, the total polymer injected, the ultimate oil recovered, etc. are indicated in Table I:

TABLE I EFFECT OF POLYMER INJECTION SCHEME ON TERTIARY OIL RECOVERY

| Run | Injected scheme (percent formation pore volume, and p.p.m.) | Total polymer injected, PV × p.p.m. | Residual oil saturation, before flood percent | Oil recovered percent |
|---|---|---|---|---|
| 1 | 5% (1,000 p.p.m.), 5% (water), 40% (125 p.p.m.), (water) * | 100 | 35.6 | 72.0 |
| 2 | 8% (800), 5% (water), 5% (200), 5% (water), 5% (200), 5% (water), 5% (200), 5% (water), 5% (200), (water)* | 104 | 38.1 | 68.8 |
| 3 | 10% (800), 5% (water), 20% (600), 10% (water), 5% (400), (water) * | 220 | 35.9 | 82.7 |
| 4 | 5% (1,200), 5% (water), 20% (800) 10% (water), 10% (400), (water) * | 260 | 36.1 | 84.3 |
| 5 | 8% (1,200); 5% (water), 20% (800), 5% (water), 30% (500), (water) * | 406 | 35.7 | 89.6 |
| 6 | 5% (3,000), 5% (water), 10% (1,000), 5% (water), 20% (500), 5% (water), 40% (400), 5% (water), 35% (100), (water)* | 545 | 37.4 | 90.6 |
| 7 | 20% (2,500), 10% (water), 30% (800), 10% (water), 10% (100), (water) * | 750 | 38.6 | 90.1 |

*Drive water is injected until no more oil is produced at end of core.

It is not intended that the invention be limited by the above example. Rather, all equivalents obvious to those skilled in the art are intended to be included within the scope of the invention as defined in the specification and appended claims.

What is claimed is:

1. In a process of recovering crude oil from a subterranean formation comprised of injecting into the formation a mobility buffer comprised of an aqueous solution containing mobility reducing agent and displacing it with drive water toward a production means in fluid communication with the formation to recover crude oil through the production means, the improvement comprising:
   1. injecting 5 percent up to about 25 percent formation pore volume of the mobility buffer, followed by
   2. 5 percent up to about 25 percent formation pore volume of drive water, and
   3. repeating step (1) at least once, and
   4. then injecting sufficient drive water to displace the mobility buffer toward the production means.

2. The process of claim 1 wherein a displacing agent precedes the mobility buffer slug.

3. The process of claim 2 wherein the displacing agent is selected from the group consisting of immiscible agents, miscible agents, and agents having both immiscible and miscible characteristics.

4. The process of claim 3 wherein the displacing agent is selected from the group consisting of emulsions and micellar dispersions.

5. The process of claim 1 wherein the mobility reducing agent is a partially hydrolyzed high molecular weight polyacrylamide.

6. The process of claim 1 wherein steps (1) and (2) are repeated at least twice.

7. The process of claim 1 wherein the formation pore volumes in (1) and (2) are about 5 percent up to about 15 percent.

8. In a process of recovering crude oil from a subterranean formation comprised of injecting into the formation a mobility buffer comprised of an aqueous solution containing mobility reducing agent and displacing it with drive water toward a production means in fluid communication with the formation to recover crude oil through the production means, the improvement comprising:
   1. alternately injecting about 5 percent up to 15 percent formation pore volumes of mobility buffer slugs and water slugs, and,
   2. then injecting sufficient drive water to displace the mobility buffer toward the production means.

9. In a process for recovering crude oil from a subterranean formation comprised of injecting into the formation a micellar dispersion followed by a mobility buffer comprised of an aqueous solution containing mobility reducing agent and wherein the micellar dispersion and mobility buffer are displaced toward a production means in fluid communication with the formation to recover crude oil through the production means, the improvement comprising displacing the micellar dispersion and mobility buffer by:
   1. injecting about 5 percent to about 25 percent formation pore volume of a mobility buffer followed by
   2. about 5 percent to about 25 percent formation pore volume of a water drive,
   3. repeating step (1) at least once, and
   4. then injecting sufficient drive water to displace the previously injected slugs toward the production means.

10. The process of claim 9 wherein the mobility reducing agent is a partially hydrolyzed, high molecular weight acrylamide.

11. The process of claim 9 wherein steps (1) and (2) are repeated at least twice.

12. The process of claim 9 wherein the formation pore volume in steps (1) and (2) is about 5 percent to about 15 percent formation pore volume.

* * * * *